United States Patent [19]

Nelson

[11] 4,382,352
[45] May 10, 1983

[54] APPARATUS FOR CLEANING SURFACES, INCLUDING MEANS FOR SEPARATING DEBRIS AND ABRASIVE MATERIAL

[76] Inventor: Robert T. Nelson, 12601 Arrowhead Ter., Oklahoma City, Okla. 73120

[21] Appl. No.: 240,913

[22] Filed: Mar. 5, 1981

[51] Int. Cl.³ .............................................. B24C 9/00
[52] U.S. Cl. ........................................ 51/424; 51/425
[58] Field of Search ................. 51/424, 425; 209/143, 209/639, 635

[56] References Cited

U.S. PATENT DOCUMENTS

| | | | |
|---|---|---|---|
| 1,650,727 | 11/1927 | Stebbins | 209/143 X |
| 1,885,760 | 11/1932 | Peik. | |
| 2,770,924 | 11/1956 | Mead et al. | 51/425 |
| 3,691,689 | 9/1972 | Goff | 51/424 |
| 3,716,946 | 2/1973 | Graf. | |
| 3,742,650 | 7/1973 | Graf et al. | |
| 3,877,175 | 4/1975 | Snyder | 51/425 |
| 3,900,969 | 8/1975 | Diehn. | |
| 4,020,596 | 5/1977 | Bergh. | |
| 4,222,205 | 4/1980 | Lake et al. | 51/425 X |

Primary Examiner—James G. Smith
Assistant Examiner—Willmon Fridie, Jr.
Attorney, Agent, or Firm—Bernard, Rothwell & Brown

[57] ABSTRACT

A blasting machine having a blasting device for directing abrading material at high velocity through an opening adjacent a surface to be cleaned. Incorporated between an upwardly-extending conduit for receiving rebounded, spent abrasive and an elevated hopper for delivering abrasive to the blasting device is a cleaning apparatus having sufficient vertical elongation to clean and remove debris effectively from the abrasive recovered during the cleaning operation. The upwardly-extending conduit directs the rebounded abrasive into an upper part of the abrasive cleaner. The cleaner has a series of vertically-disposed baffles to create an array of showers of debris and abrasive through which is drawn air to entrain and separate the debris from the abrasive. The abrasive after having been cleansed is collected in a lower part of the machine and returned to the elevated hopper for delivery to the blasting device. The debris withdrawn from the abrasive is collected in a remote position for discarding.

6 Claims, 2 Drawing Figures

APPARATUS FOR CLEANING SURFACES, INCLUDING MEANS FOR SEPARATING DEBRIS AND ABRASIVE MATERIAL

BACKGROUND AND DISCUSSION OF THE INVENTION

Blasting machines have been and are presently in use for cleaning various surfaces such as those on stationary tanks, ships, road surfaces, etc. by directing abrasive material at high velocity against the surface being cleaned. The apparatus for this purpose typically includes a centrifugal wheel or other propelling means for generating the energy necessary to direct the abrasive with sufficient force to remove debris and other material from the surface to be cleaned. A recovery apparatus is employed to recover both the spent abrasive and any debris generated as a result of the impact of the abrasive with the surface under the high velocity. The debris and abrasive are then typically passed to a collection hopper for delivery to the propelling or blasting device. During delivery of abrasive to the hopper air is often passed in contact with the abrasive to remove the debris before the abrasive is directed to the hopper for reuse in the blasting device. The nature of the blasting process often requires only a relatively simple abrasive-cleaning operation to place the abrasive in form for reuse.

The recovery apparatus for this purpose may include a broom apparatus for sweeping the spent abrasive and debris into a hopper located in the lower part of the machine more or less in the vicinity of the opening exposing to the blast a portion of the surface being cleaned. From this lower hopper or bin an elevator can be employed to move the abrasive to a position where it can be delivered to the hopper for gravity delivery to the centrifugal wheel or other blasting device. An alternative to this system is one in which the kinetic energy of the abrasive is employed to direct the rebounded abrasive directly into the upper hopper for reuse in blasting. In this latter situation the abrasive is energized sufficiently to rebound through ductwork to the elevated hopper or other collecting device.

It is between the apparatus for recovering the abrasive and the blasting device where a cleaning operation may be employed to remove debris from the abrasive before it is reused in the blasting device. Typically, the debris is of such a nature that simply passing air across the abrasive as it is being directed toward the hopper or the centrifugal wheel will be sufficient to place the abrasive in the proper form. However, in some cleaning operations this approach to cleaning or removing the debris is not satisfactory. Particularly when cleaning a concrete or asphalt surface such as those represented by streets and highways, in order to remove the stripes or other marking that are along the center or other parts of the surface, the debris generated is so great that the abrasive cleaning systems may not remove sufficient amounts of the debris before the abrasive is recirculated through the centrifugal wheel or other propelling means. The resulting building-up of debris in the system makes the blasting operation less efficient. Moreover, satisfactory abrasive cleaning operations have not been available in compact, mobile blasting machines which are otherwise suitable for cleaning road surfaces.

In the present invention these deficiencies in the abrasive recovering and cleaning operation are overcome. In particular, in compact, mobile blasting machines that must operate in restricted areas, the size and maneuverability of the machine, as well as its adequacy in accomplishing its work efficiently, are important considerations. Problems are, therefore, presented in reaching these goals, and thus providing for efficient and effective recycling of the abrasive while performing adequate cleaning of the abrasive, even when the machine is employed to clean surfaces such as concrete and asphalt that results in the production of greater amounts of debris in the shot compared with a treatment of a metal surface such as steel.

The present invention meets this challenge by relying on the rebound energy of the abrasive to carry the particles from the surface being treated to the upper part of the device where the particles enter and pass through an elongated, multiple cleaning zone chamber for removing substantial amounts of debris from the abrasive. The cleaned abrasive collects in a lower part of the machine and is conveyed to an elevated hopper located in the upper part of the machine and from which abrasive passes to the blasting device such as a centrifugal wheel. These functions are provided in a compact, maneuverable, mobile machine that is convenient and efficient to use, even in cleaning abrading surfaces such as concrete and asphalt.

In the preferred embodiment the abrasive cleaning portion of the machine contains a vertically-positioned chamber in which a series of showers of debris and abrasive are formed and through which air is drawn to remove the debris. The abrasive after having been showered for debris removal is collected in the lower portion of the cleaning apparatus for delivery to the elevated hopper for recycle to the blasting device. To form the series of showers, the chamber can have an array of baffles including a plurality of spaced-apart sets of baffles along the length or height of the chamber. Between the sets of baffles there ae a series of air inlets, and the baffles direct showers of debris and abrasive along a wall having the inlets therethrough. On an opposing wall there are air outlets connected to an exhause fan for drawing the air containing separated debris away from the chamber. In this manner each shower of abrasive and debris is subjected to an air current from the side inlets, through the respective separation zones of the chamber toward the side outlets and ultimately to an exhaust fan for entraining, collecting and removing the debris from the abrasive material. The bottom of the chamber is constructed to return the abrasive to an elevator or other means for recirculation of abrasive to the elevated collection hopper for feeding to the blasting device.

The recovery conduit used to direct the spent abrasive and debris to the abrasive cleaning chamber is configured to direct rebounding abrasive sufficiently inwardly to enter the cleaning apparatus. The recovery conduit receives the removed debris and rebounded abrasive usually in a diffuse pattern, concentrates this stream, while reducing the remaining energy to an acceptable level, and delivers the stream to the abrasive cleaning apparatus. This system thus provides a recovery apparatus which employs the kinetic energy of the abrasive to move the debris and abrasive through a substantial height of the machine in order to accomplish adequate cleaning of the abrasive.

The above discussion is a rather general description of features of the invention in conjunction with some problems which have existed in prior surface-cleaning machines. Other features and advantages of the invention will become apparent in the detailed discussion of the preferred embodiment of the invention which follows.

DETAILED DESCRIPTION OF THE PREFERRED EMBODIMENT

Figure 1:
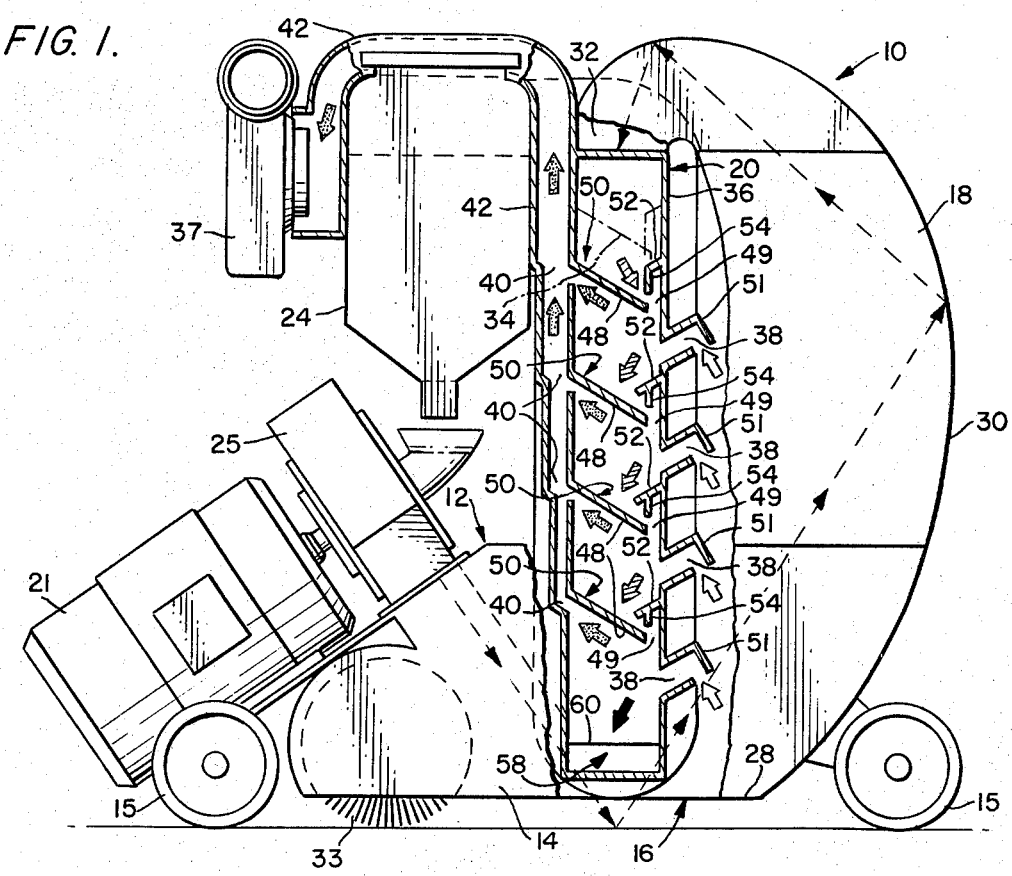
FIG. 1 is a side view of the blasting apparatus of the invention.

With reference to FIG. 1, the apparatus or blasting machine generally indicated as 10 includes an enclosure or housing 12 having a blast chamber 14 with an opening 16 for exposing to the housing a part of a generally horizontal surface to be cleaned to the blast chamber. In general the cleaning apparatus 10 includes a recovery conduit 18 for recovering the mixed spent abrasive and debris generated during the cleaning operation, an abrasive cleaning chamber 20 for separating the debris from the abrasive, and an elevator 64 for delivering clean abrasive to a hopper 24. In communication with opening 16 and the hopper 24 is a centrifugal wheel 25 for receiving abrasive from the hopper 24 and propelling it at high velocity toward opening 16 in blast chamber 14. The centrifugal wheel is powered by electric motor 21. The machine has wheels 15 for moving the machine along the surface being cleaned. This movement may be done manually by use of a handle arranged on the machine, but preferably the wheels are geared to a power source such as electric motor 21 for moving the machine along the surface.

The opening 16 also receives rebounding particles from the surface being treated and the scale, deposits or other material being removed from the surface. The shape of the opening may be of various configurations, but preferably the opening is oblong and in an oval or rectangular shape with the major axis opening parallel to the projecting means, for example, a centrifugal wheel located in the housing and at an angle to the vertical such that the abrasive will be rebounded into the recovery conduit 18. The orientation of centrifugal blasting wheel is preferably such that the abrasive strikes the surface at an incidence or direction counter to the forward movement of the apparatus. However, alternatively the orientation of the wheel may be such that abrasive has an angle of incidence that is concident with or in the same direction as forward movement of the apparatus. Frequently, the abrasive is projected at an acute angle of about 30° to 89° and preferably about 45° to 75° relative to the surface being cleaned. The abrasive due to the high speeds at which it is propelled to the surface will rebound from the surface into recovery conduit 18. The angle to the surface at which the abrasive rebounds, the angle of reflectance, will depend on the angle of incidence of the abrasive, the configuration of abrasive and the surface being treated at the point of impact, the action of the abrasive on the surface and the like. Generally, the angle of reflectance is diffuse, and the recovery conduit 18 which may be of smaller cross-sectional area at its upper part compared with its lower part, concentrates the abrasive and debris recovered into a more dense pattern for charging to abrasive cleaning chamber 20.

The projected abrasive has substantial amounts of kinetic energy, and some of this energy is depleted due to the action of the abrasive on the surface being treated, and by impacts among the abrasive particles and with the walls of the enclosure. Hence, the kinetic energy of rebounding abrasive particles may vary widely. The apparatus of this invention is thus provided with recovery conduit 18 for recovering the diffuse stream of debris and abrasive through its rebounding action. The stream is concentrated and directed through an upper discharge opening 32 of conduit 18 onto a ramp 34 which feeds the mixed debris and abrasive to the abrasive cleaning chamber 20.

Figure 2:
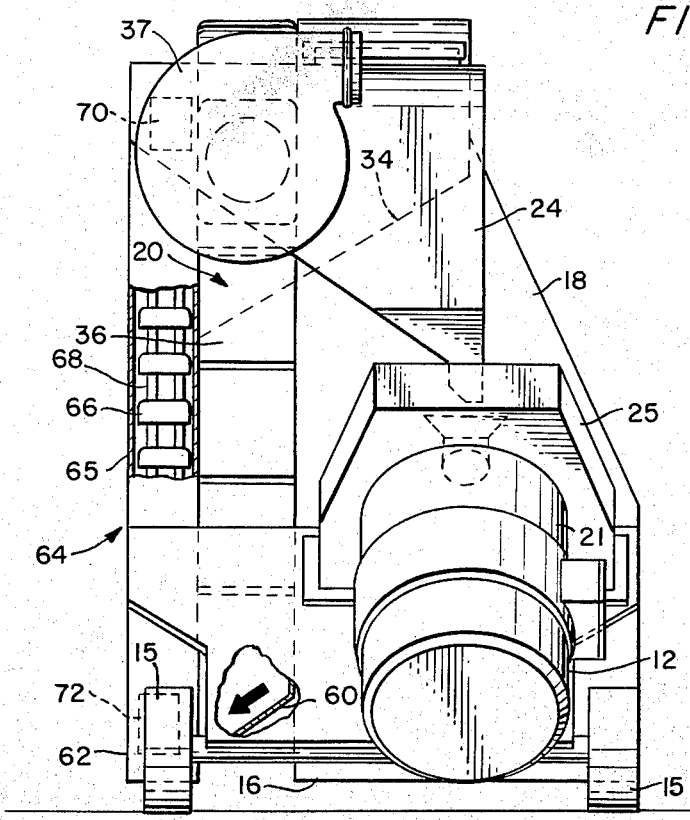
FIG. 2 is an end view of the apparatus as shown in FIG. 1 with a portion removed to show the elevator for carrying the cleaned abrasive to the feed hopper for the blasting device.

Conduit 18 is configured to both concentrate the diffuse pattern of debris and abrasive, as well as attenuate the velocity of this material being collected so that it can be directed to the ramp 34 in a controlled and concentrated fashion. For this purpose the conduit 18 includes an outer, curved wall 30 communicating with discharge opening 34 at one end, and lower opening 28 which is in communication with the blast chamber 14 at the other end. The entire conduit 18 has an inverted "J" shape in configuration with the discharge opening being at the upper part of the inverted "J", i.e., at the bottom of the shorter leg. In this manner, mixed abrasive and debris rebounding from the surface, as can be seen from FIG. 1, richochets off the outer, curved wall 30 and other portions of the walls of the conduit as the mixture moves upwardly until it is directed around the curve portion of the "J" downward toward discharge opening 32 which in turn delivers the concentrated and attenuated debris and abrasive to the ramp 34 for feeding this material to the abrasive cleaning apparatus 20. The abrasive and debris may strike one or more walls of the conduit 18 prior to being directed to its discharge opening, and these impacts assist in reducing the kinetic energy of the abrasive. In order to collect a substantial portion of the richocheting stream the lower entrance area of the inverted "J" conduit has a large cross sectional area in communication with blast chamber 14 to encompass the blast pattern as can be seen in FIG. 2. Conduit 18 becomes a lesser cross-section towards its upper or discharge end.

As can be seen from FIG. 1 the upper part of the conduit 18 is tapered inwardly to discharge opening 32, and oriented such that abrasive which impacts against the walls tends to ricochet toward opening 32. The debris and abrasive are directed toward the cleaning apparatus primarily, if not solely, through the action of the kinetic energy remaining in these materials after they have been popelled against the surface to be cleaned. However, rotating broom 33 is located within chamber 14 to sweep material which does not have sufficient kinetic energy to find its way to discharge opening 32. Broom 33 can capture the stray abrasive and debris and sweep them into the propelled abrasive stream to give it sufficient kinetic energy for collection purposes within the conduit 18. In the alternative, the broom can generate energy or be located such that the material captured by the broom is directed with sufficient energy into conduit 18 so that the material swept by the broom will be propelled along in the main rebounding particle stream and be collected at the discharge opening 32.

From the conduit 18 the collected abrasive and debris are directed through the discharge opening 32 to ramp 34 and to the abrasive cleaning apparatus 20. As can be seen in FIG. 1, the separated debris is drawn through outlet duct 42 by exhaust fan 37, while the cleaned abrasive is ultimately directed toward the elevator 62 for delivery to hopper 24. Specifically, abrasive cleaning apparatus 20 includes an elongated, vertically-arranged chamber 36 having a series of air inlets 38 and air outlets 40 on the opposite side of the chamber. The outlets 40 are connected to the outlet duct 42. In this manner, exhaust fan 37 can draw a series of air streams through air inlets 38 and across the falling debris to entrain and withdraw the debris through the air outlets 40 and ultimately into exit duct 42. If desired any convenient filter or other collecting means can be provided in the vicinity of exhaust fan 37 to collect the entrained debris.

Chamber 36 includes a series of sets of baffles 50 spaced throughout the height of chamber 36 and arranged in vertical disposition as shown in FIG. 1. This arrangement produces a series of showers between the sets of baffles 50 along one face or wall of the chamber 36 where the air flow is concentrated through air inlets 38 for entraining and withdrawing the debris. Each set of baffles 50 includes a first baffle plate 48 sloping downwardly from a rear wall of chamber 36 toward air inlets 38 in the front wall of the chamber which air inlets are located approximately midway between adjacent sets of baffles. The ends of baffle plates 48 closest to the front wall of chamber 36 are slightly spaced therefrom to form a slot or opening 49 extending laterally to provide a shower of debris and abrasive along the front wall past the next lower air inlet 38.

In addition to these first baffle plates 48, there is extending from the front wall toward the rear wall and slightly above the opening 49 an opposed baffle plate 52 for each baffle set 50. Opposed baffle plate 52 is shorter in length than baffle plate 48 and spaced therefrom to provide flow paths toward openings 49 while covering openings 49 sufficiently that there is not a direct path for the solid particles from a preceding shower passing directly to the adjacent, next lower opening 49. Extending downwardly from opposed baffle plate 52 is a vertical baffle plate 54 the end of which is spaced above the lower, open end of first baffle plate 48. Except for the first opposed baffle plate closest to the ramp 34, vertical baffle plates 54 are located intermediate the front wall and the end of the opposed baffle plates 52.

With this configuration, the debris as it is showered from one set of baffle plates to another, will be directed toward rear wall of chamber 36 before being forced through the next lower opening between the vertical baffle plates 54 and the ends of the first baffle plates 48. The vertical baffle plates 54 can act as a metering device to prevent undue accummulation of the particle stream in openings 49. Otherwise, the stream could become overly dense thereby adversely affecting the ability of the air stream to entrain and remove debris. Furthermore, the debris and abrasive are forced to take a rather convoluted path after having been showered across the face or front wall of chamber 36 before being showered through the next set of baffles 50. The showering and convoluted path insures a good circulation of air through the debris to separate the debris from the abrasive.

Air inlets 38 are connected to nozzles 51 extending outwardly from chamber 36 which force the air in a somewhat downward direction toward the rear wall of the chamber, before eventually being circulated upwardly toward the air outlet 40. As can be seen from FIG. 1 air outlets 40 are located adjacent the uppermost set of adjacent baffle assemblies 50 while air inlets 38, as discussed above, are located about midway between adjacent sets of baffles 50. This location of the air inlets 38 and outlets 40 in conjunction with the baffle configuration discussed above further enhances the air circulation and cleaning ability of the air as it is drawn through the resulting showers of debris and abrasive.

In this preferred embodiment after the debris and abrasive have been showered through a plurality, e.g. four sets, of baffles 50, the cleaned abrasive is collected in the chamber bottom 58 from which it is fed by ramp 60 to a bin or elevator bottom 62. A vertically-oriented elevator system 64 is contained within housing 65 and arranged to deliver the cleaned abrasive from the bin 62 to the hopper 24. The elevator system includes a series of equally-spaced buckets 66 on an endless belt 68 sheaved about upper and lower sheaves 70, 72 respectively for rotating belt 68, and ultimately the buckets 66, along a continuous path from top to bottom of the elevator system 64. As can be seen the empty buckets 66 are moved downwardly toward the bin 62 where as they are rotated about the lower sheave 72 they scoop the abrasive and carry it upwardly along the path of the belt as it is moved toward upper sheave 70. As filled buckets 66 are rotated about the upper sheave 70 their velocity is such that they dump or throw the material into the hopper 24. The hopper 24 in turn feeds clean abrasive to centrifugal wheel for reuse as the cleaning agent.

With the structure as described above, the cleaning apparatus can remove substantial debris from a highway or other surfaces where the debris is excessive, collect this debris and have it cleaned from the abrasive material so that the abrasive material can be recycled or reused in the cleaning process. The machine is mobile, compact and easy to maneuver and provides effective cleaning of substantially horizontal surfaces, which includes those that are somewhat elevated or inclined.

I claim:

1. An apparatus for the treatment of a surface with particulate abrasive material projected at high velocity comprising:
   (a) projecting means for propelling a stream of particulate abrasive material against the surface to be treated;
   (b) a vertically disposed cleaning chamber for removing debris from abrasive material propelled toward and rebounding from the surface; said cleaning chamber having an upper inlet for receiving abrasive material and debris;
   (c) a recovery conduit for receiving and directing a stream of abrasive material and debris rebounding from the surface to said cleaning chamber inlet;
   (d) said cleaning chamber further comprising a plurality of vertically arranged compartments;
   (e) each of said compartments including a first vertical wall and a second vertical wall opposite said first vertical wall and further including a solid inclined baffle extending from said first vertical wall toward said second vertical wall and terminating short of said second vertical wall to provide a passage adjacent said second vertical wall for passage of abrasive material and debris from one compartment to the next lower compartment;
   (f) a plurality of first openings in said second vertical wall for admitting air to said compartments, each of said first openings being arranged between successive baffles;

(g) a plurality of second openings in said first vertical wall for discharging air and debris from said compartments, each of said second openings being immediately below a corresponding one of said baffles; and (h) means for causing air to move transversely of said compartments from each of said first openings through the corresponding compartment and for discharging the air and entrained debris through the corresponding second opening;

(i) abrasive material and any remaining debris being caused to flow down each said inclined baffle and to be discharged from the end thereof into a corresponding one of said passages directly above the next lower one of said first openings.

2. The apparatus according to claim 1 wherein said chamber further includes a collector for receiving abrasive material from the lowermost of said baffles.

3. The apparatus according to claim 1 wherein each of said compartments further includes a second baffle extending from said second vertical wall above the corresponding one of said passages and downwardly toward the corresponding inclined baffle to insure that abrasive material is directed to said inclined baffle and falls from the end of said baffle through the corresponding passage.

4. The apparatus according to claim 3 wherein said second baffle includes a substantially vertical member extending toward said inclined baffle near the lower end thereof but spaced therefrom.

5. The apparatus according to claim 1 and further including:

(a) a hopper for receiving abrasive material and supplying the abrasive material to said projecting means;

(b) said cleaning chamber including at the bottom thereof means for collecting cleaned abrasive material; and (c) an elevator for conveying said cleaned abrasive material from said collecting means to said hopper.

6. The apparatus according to claim 1 and further including:

(a) a blast chamber, said projecting means propelling a stream of abrasive material through said blast chamber to the surface to be treated;

(b) broom means positioned to engage said surface for sweeping the surface, said broom means extending into said blast chamber for moving swept material into said blast chamber and into the stream of material propelled by said projecting means.

* * * * *